(12) United States Patent
Durbha (10) Patent No.: US 9,413,762 B2
(45) Date of Patent: Aug. 9, 2016

(54) ASYNCHRONOUS USER PERMISSION MODEL FOR APPLICATIONS

(71) Applicant: Cable Television Laboratories, Inc., Louisville, CO (US)

(72) Inventor: Seetharama Durbha, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 485 days.

(21) Appl. No.: 13/919,907

(22) Filed: Jun. 17, 2013

(65) Prior Publication Data

US 2014/0373099 A1 Dec. 18, 2014

(51) Int. Cl.
*H04L 29/06* (2006.01)

(52) U.S. Cl.
CPC ............ *H04L 63/10* (2013.01); *H04L 63/0807* (2013.01)

(58) Field of Classification Search
USPC ............................................................ 726/4
See application file for complete search history.

(56) References Cited

U.S. PATENT DOCUMENTS

| 2014/0189808 A1* | 7/2014 | Mahaffey | H04L 63/0853 726/4 |
| 2014/0245411 A1* | 8/2014 | Meng | H04L 63/08 726/7 |
| 2014/0245461 A1* | 8/2014 | O'Neill et al. | G06F 21/60 726/28 |

* cited by examiner

*Primary Examiner* — Tu Nguyen (74) *Attorney, Agent, or Firm* — Great Lakes Intellectual Property, PLLC (57) ABSTRACT

Use of an application to engage services on behalf of a third party is contemplated. The services may be engaged one behalf of the third party with delivery of a third party permission to a Web service, optionally with the third party permission being recognized in the form of an access token (accessToken) provided from the application to the Web service without requiring the application to interact with an user-agent used to obtain the third party permission.

20 Claims, 11 Drawing Sheets

ASYNCHRONOUS USER PERMISSION MODEL FOR APPLICATIONS

TECHNICAL FIELD

The present invention relates to facilitating third party permissions for an application, such as but not necessary limited to enabling an application to authorize access to a Web service without requiring the application to interact with a user-agent or Web browser used to obtain the third party permission.

BACKGROUND

Figure 1:
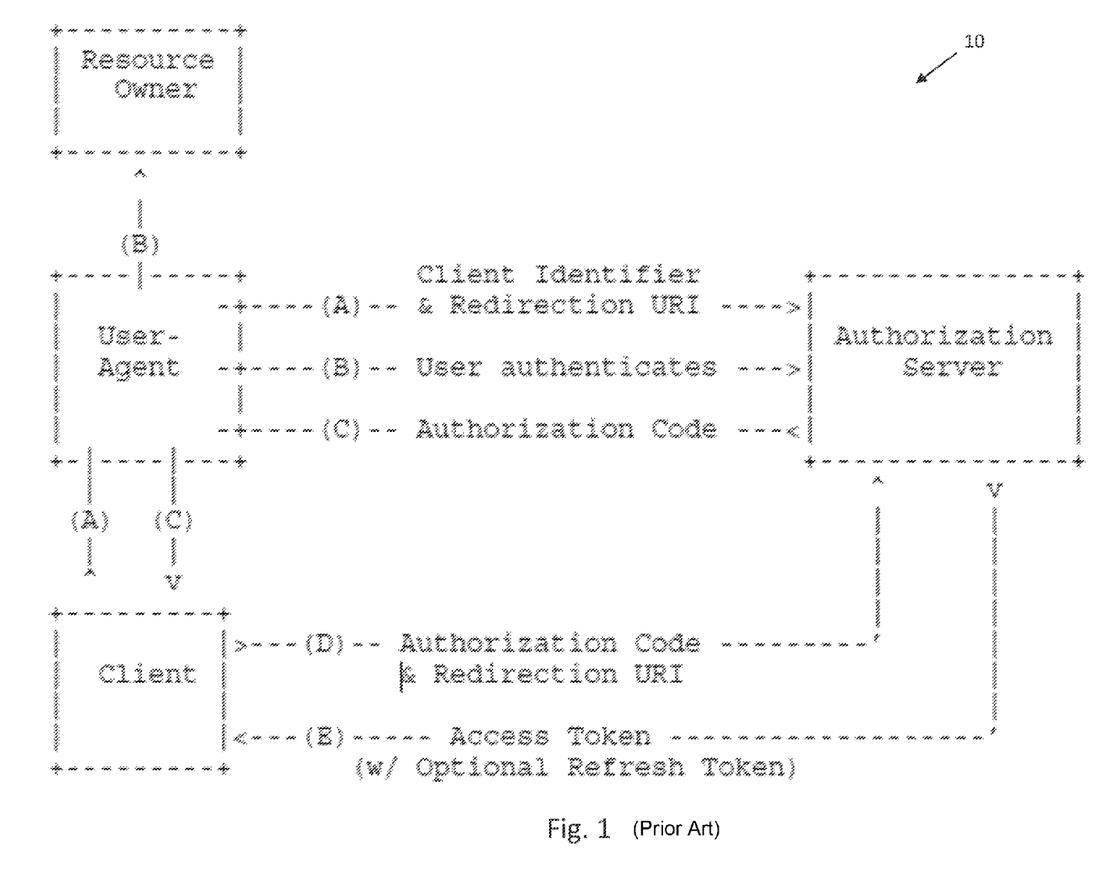
FIG. 1 illustrates an Oauth 2.0 Authorization Framework.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. FIG. 1 graphically represents an authorization code flow 10 for OAuth 2.0 Authorization Framework as reproduced from RFC 6749, Copyright (c) 2012, IETF Trust. RFC 6749, the disclosure of which is hereby incorporated by reference in its entirety, describes the authorization code flow as follows:

The authorization code grant type is used to obtain both access tokens and refresh tokens and is optimized for confidential clients. Since this is a redirection-based flow, the client must be capable of interacting with the resource owner's user-agent (typically a Web browser) and capable of receiving incoming requests (via redirection) from the authorization server. The lines illustrating steps (A), (B), and (C) are broken into two parts as they pass through the user-agent. The flow illustrated in FIG. 1 includes the following steps:

(A) The client initiates the flow by directing the resource owner's user-agent to the authorization endpoint. The client includes its client identifier, requested scope, local state, and a redirection URI to which the authorization server will send the user-agent back once access is granted (or denied).

(B) The authorization server authenticates the resource owner (via the user-agent) and establishes whether the resource owner grants or denies the client's access request.

(C) Assuming the resource owner grants access, the authorization server redirects the user-agent back to the client using the redirection URI provided earlier (in the request or during client registration). The redirection URI includes an authorization code and any local state provided by the client earlier.

(D) The client requests an access token from the authorization server's token endpoint by including the authorization code received in the previous step. When making the request, the client authenticates with the authorization server. The client includes the redirection URI used to obtain the authorization code for verification.

(E) The authorization server authenticates the client, validates the authorization code, and ensures that the redirection URI received matches the URI used to redirect the client in step (C). If valid, the authorization server responds back with an access token and, optionally, a refresh token.

OAuth 2.0 may be utilized to enable an application to obtain limited access to an HTTP service on behalf of a resource owner. As noted in the portion of RFC 6749 reproduced above, the client/application, must be capable of interacting with the resource owner's user-agent (Web browser) in order to obtain such access. One non-limiting aspect of the present invention contemplates facilitating similar access without requiring the client/application to interact with the resource owner's user-agent or Web browser.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 2:
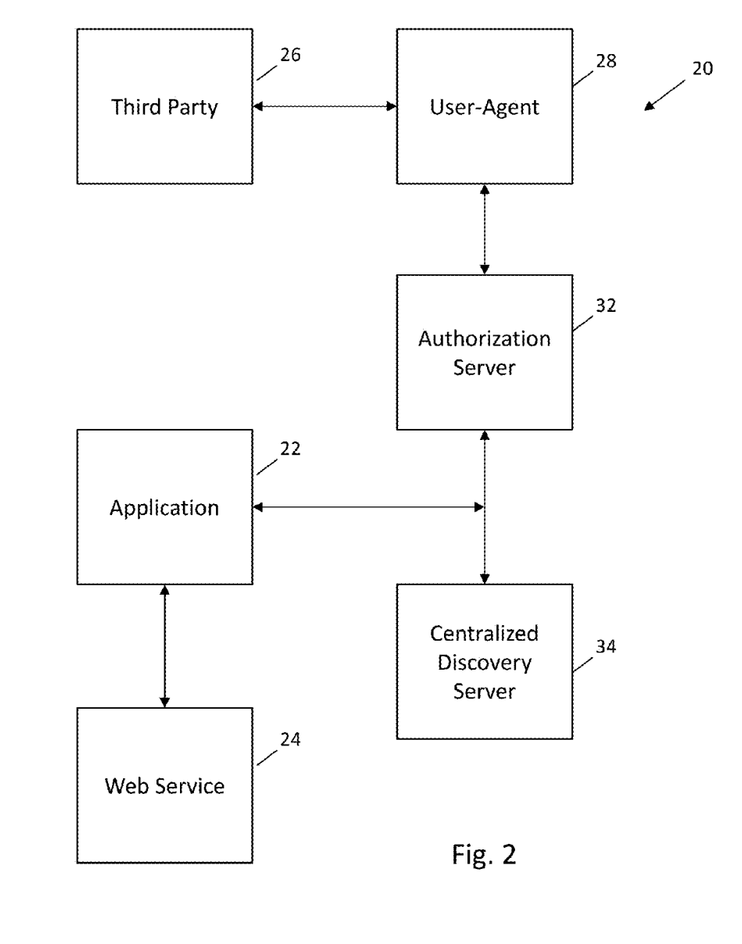
FIG. 2 illustrates an asynchronous user permission system in accordance with one non-limiting aspect of the present invention.

FIG. 2 illustrates an asynchronous user permission system 20 in accordance with one non-limiting aspect of the present invention. The system 20 may be configured to enable an application 22 to engage a Web service 24 with express permission of a third party 26 without requiring the application 22 to interact with a user-agent 28 through which the third party 20 permission is authorized. The system 20 is predominately described with respect to facilitating asynchronous permissions necessary to engage the Web service 24 without necessary intending to limit the scope and contemplation of the present invention to Web services 24 as similar operations may be performed to engage non-Web services. The use of the present invention to engage Web service 24 is believed to particularly beneficial in enabling applications 22 lacking visibility to the user-agent 28 or the ability to support graphical user interfaces or the rich user interaction associated with webpages capabilities to invoke operations requiring invocation through Web pages, i.e., those requiring Hypertext Transfer Protocol (HTTP) commands to facilitate deliver of content and/or event execution through the application.

The capability to perform Web events (services associated with the Web service 24) through the application 22, for example, may be beneficial in allowing a home appliance, like an alarm clock, to access a Web-based calendar service of a particular third party 26 in order to schedule or invoke an event, such as but not limited to enabling an alarm clock to generate an alarm to coincide with a calendar event; a smart refrigerator to schedule recording of a favorite show; a smart watch to display if a new email is received; a smart watch to display an emergency alert or service message; a camera to upload photos to a site; a smart health band to upload data to a particular Web site; and/or a security camera to send an alert when it detects an intrusion. The present invention contemplates its use and application with various Web services 24 or software services provided by an entity that can be reached through the Internet. The service could either perform a task and/or retrieve data belonging to the user identified by the access token used to invoke the service.

The Web service 24 may require an access token, credential or other authority prior to performing or otherwise directing the event requested by the application on behalf of the third party 26. The access token required to engage the Web service 24 may be the same or similar to the access token and other tokens described in the Oauth 2.0 Authorization Framework and/or other access tokens, credentials or metadata otherwise authorized for use with the Web service 24. The access token may be of the type that requires a third party authorization or permission prior to being provided to the application 22 or that is otherwise generated or accepted for use only following receipt of the third party authorization, i.e., the access token may be a time-dependent token generated after authorization. The parameters and characteristics of the access token may be varied according to the Web service 24, characteristics of the application 22 or client (not shown) hosting the application 22 and/or as a function of any number of other variables commonly employed to enable secured use of access tokens. One non-limiting aspect of the present invention contemplates the access token being generated with an authorization server 32. The authorization server 32 may be an identity provider (IdP) or other service having capabilities sufficient to facilitate authenticating the application 22 and/or providing access token sufficient for use with various Web services 24.

The authorization server 32 is shown to be in communication with a centralized discovery server 34. The centralized discovery server 34, as described below in more detail, may be a centralized entity or service tasked with communicating with various authorization servers 32 in order to provide a default location through which the authorization server 32 relevant to a particular application may be identified. The present invention contemplates a distributed system where applications 22 may require authorizations (access tokens) from certain authorization servers 32 depending on their current location, the Web service 24 being engaged, their operating capabilities, etc. The corresponding authorization server 32 may be specific to a provider used to provide services to a location or network associated with the application 22, e.g., a multiple system operator (MSO), a cable, broadcast or satellite television provider, a home security provider, a smart-grid or electric system provider, an internet service provider (ISP), a cellular or VoIP phone provider, etc. may have dedicated or proprietary authorization servers for providing access tokens suitable for use in their attendant infrastructures. While the authorization server 32 and the centralized discovery server 34 are show to be separate entities the functionality and operations associated with each may be commonly located and/or the performed on the same server without deviating from the scope and contemplation of the present invention.

The authorization server 32 is shown to communication with the user-agent 28. The authorization server 32 may be configured to communicate with the user-agent 28 in the manner described in the Oauth 2.0 Authorization Framework to obtain third party authorizations and/or authorizations from the resource owner to provide access tokens to a requesting application 22 and/or the authorization server 32 may be configured to communication using other mechanisms and communication protocols with other types of user-agents 28 suitable to facilitate receiving third party authorizations, i.e., Web browser, customer premise equipment (e.g., a settop box (STB), tablet, second screen application, mobile phone, etc.). The application 22 may identify the Web service 24 requiring the access token to the authorization server 32, optionally in addition to providing other information, whereby the authorization server 32 performs related processing to identify a suitable access token and mechanism to obtain authorization from a suitable third party 26. For the purposes of explanation and without necessarily intending to limit the scope and contemplation of the present invention, the authorization server 32 associated with a particular third party 26 or application 22 may be assumed to include or having capabilities sufficient to collect all necessary access tokens. In this manner, the authorization server 32 may look-up access tokens as a function an IP address or other identification information associated with the application 22 or hosting client to identify the proper access tokens and the third party 26 authorized to permit the use thereof.

Figure 3:
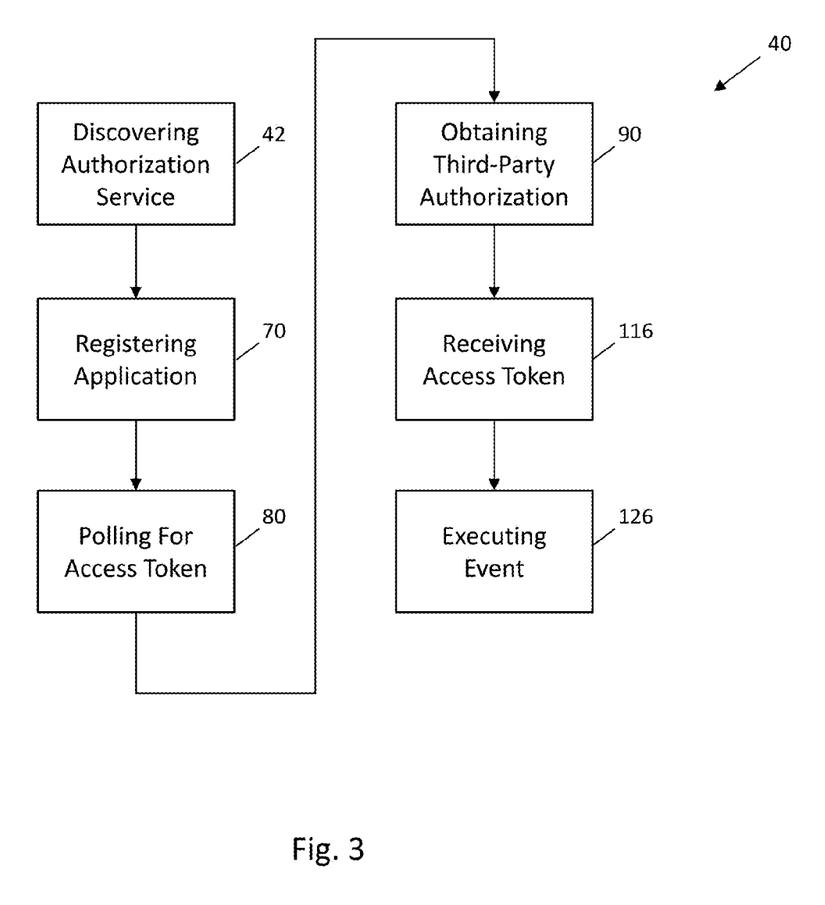
FIG. 3 illustrates a flowchart for a method of providing an access token in accordance with one non-limiting aspect of the present invention.

FIG. 3 illustrates a flowchart 40 for a method of providing an access token in accordance with one non-limiting aspect of the present invention. The method 40 may relate to providing the access token to an application 22 without requiring the application 22 to interact with a user-agent 28 through which a third party 26 contemporaneously authorizes use of the access token. The method 40 may be embodied in a computer program product and/or computer-readable medium having non-transitory instructions stored therein, which when operable with a processor, are sufficient to facilitate the operations contemplated herein. The method 40 is predominately described with respect to providing the access token in order to permit the application 22 to execute an operation or function associated with a Web service 24 on behalf of the third party 26, such as to facilitate syncing an alarm clock to a Web-based calendar event for a calendar service of the third party 26. The contemplated method may be beneficial with Web services 24, particularly those that operate in accordance with the Oauth 2.0 Authorization Framework, to enable access token use with applications 22 lacking the capability to provide a Web browser or interact with a Web page, application program interface (API) or other mechanism employed by the Web service 24 to authorize a third party 26 use thereof. This capability may useful with home appliances, CPE and other devices connected to a local area network (LAN) to engage services that they would otherwise be unable to engage due to an inability to obtain any necessary third party authorizations.

Block 42 relates to discovering an authorization server 32 suitable for use with the application 22 requesting engagement of the Web service 24, and thereby, use of a corresponding access token. The discovery process may correspond with the application 22 contacting a default entity 34 or other programmed entity in order to ascertain addressing or other information necessary to contact the authorization server 32 having access tokens or other content required to engage the desired Web service 24. One non-limiting aspect of the present invention contemplates facilitating the discovery process by providing the application 22 with application authorization universal resource locator (appAuthURL) and an access token universal resource locator (accessTokenURL). The appAuthURL may be used to identify a universal resource indicator (URI) or other information associated with a location at which the application 22 may register with a suitable authorization server to request an appropriate access token. The accessTokenURL may be used to identify a URI or other information associated with the location at which the application 22 may provide the access token in order to engage the Web service 24 in the desired manner. While the present invention contemplates providing the appAuthURL and the accessTokenURL to the application 32 as part of the discovery process 42, the present invention fully contemplates other information being discovered and/or provided to the application 22 in order to facilitate subsequent use of an access token.

Figure 4:
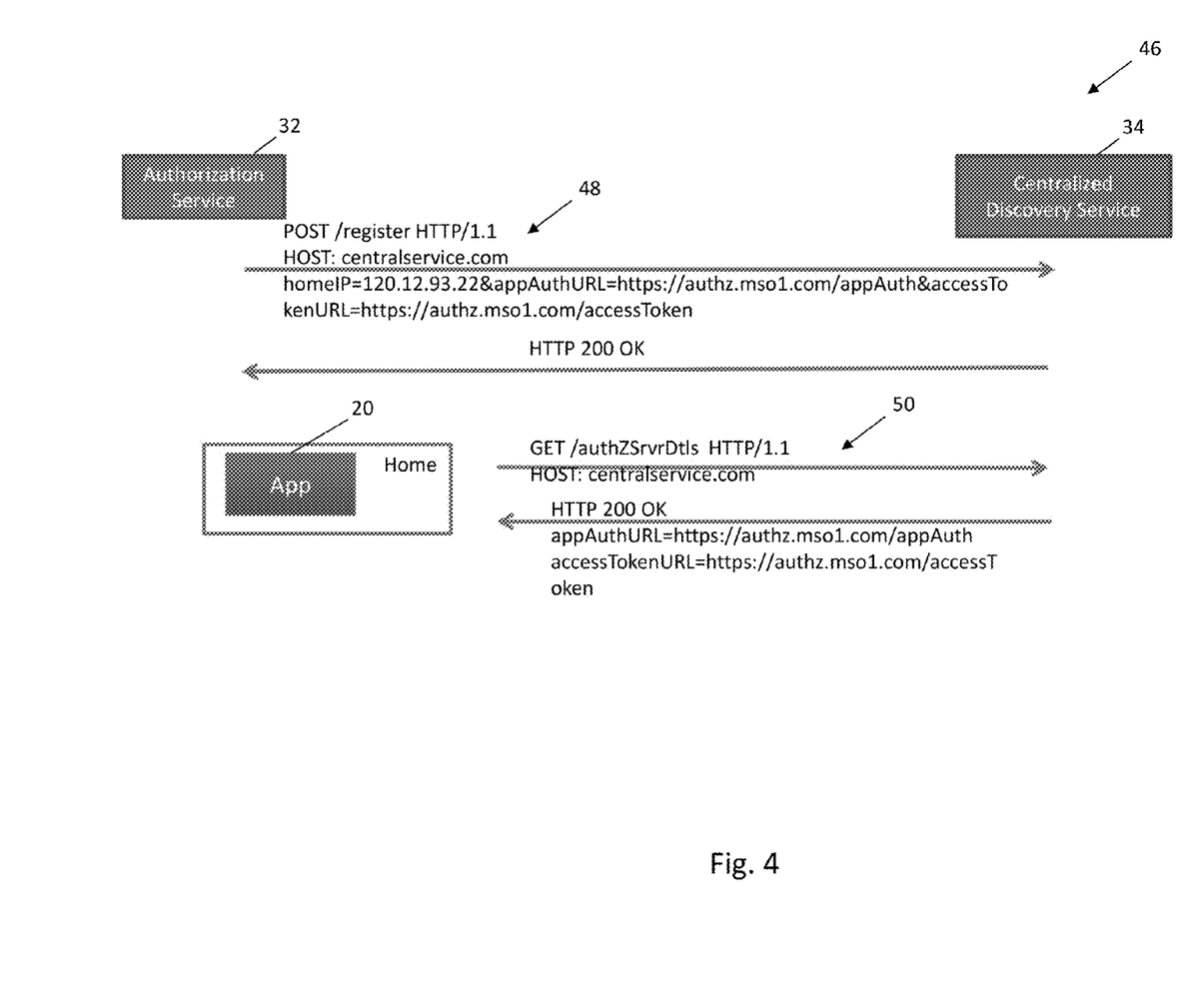
FIG. 4 illustrates a messaging diagram for an IP address discovery process in accordance with one non-limiting aspect of the present invention.

FIG. 4 illustrates a messaging diagram 46 for an IP address discovery process contemplated by one non-limiting aspect of the present invention. The IP address discovery process 46 may correspond with the application 22 being provided the appAuthURL and the accessTokenURL as a function of an IP address associated with the application 22 or the hosting client. The IP address discovery process 46 may include the authorization server 32 executing an HTTP POST 48 to the centralized discovery server 34. The HTTP POST 48 may include various parameters, optionally including an IP address associated with the application (120.12.93.22), the application authentication URL (https://authz.mso1.com/appAuth) and the accessTokenURL (https://authz.mso1.com/accessToken). The centralized discovery server 34 may be configured to store the parameters as a function of the IP address, which for exemplary purposes is shown to correspond with a home IP address associated with a home network to which the application 22 is connected. The authorization server 32 may be configured to generate the HTTP POST 48, and thereby, provide the appAuthURL and the accessTokenURL, in addition to the IP address and other optional information, to the centralized discovery server 34 in response to deployment of a router or gateway used to provide the home network and/or in response to another registering event, such as in response to a prior contact from application 22 or subscriber associated with the home network.

The authorization server 32 may be configured to provide the HTTP POST 48 to the centralized discovery server 34 prior to the application 22 attempting to engage the Web service. When attempting to engage the Web service 24, the application 22 may thereafter transmit an HTTP GET 50 to the centralized discovery server 34. The application 22 may transmit the HTTP GET 50 to the centralized discovery server 34 instead of the authorization server 32 due to pre-programming or default settings of the application 22, the hosting client or the home network directing the application 22 to the centralized discovery server 34. The use of the centralized discovery server 34 in this manner may be beneficial in allowing the application 22 to contact an appropriate entity without having to be aware of the authorization server 32 or other entity actually having the appropriate access token in advance, which may be beneficial in facilitating deployment of the present invention and limiting processing and implementation demands on the corresponding system. The centralized discovery server 34 may be configured to provide the appAuthURL and the accessTokenURL to the application 22 in an acknowledgment message transmitted as part of the HTTP GET 50. The centralized discovery server 34 may identify the appropriate the appAuthURL and the accessTokenURL as a function of an IP address included within the HTTP GET 50.

Figure 5:
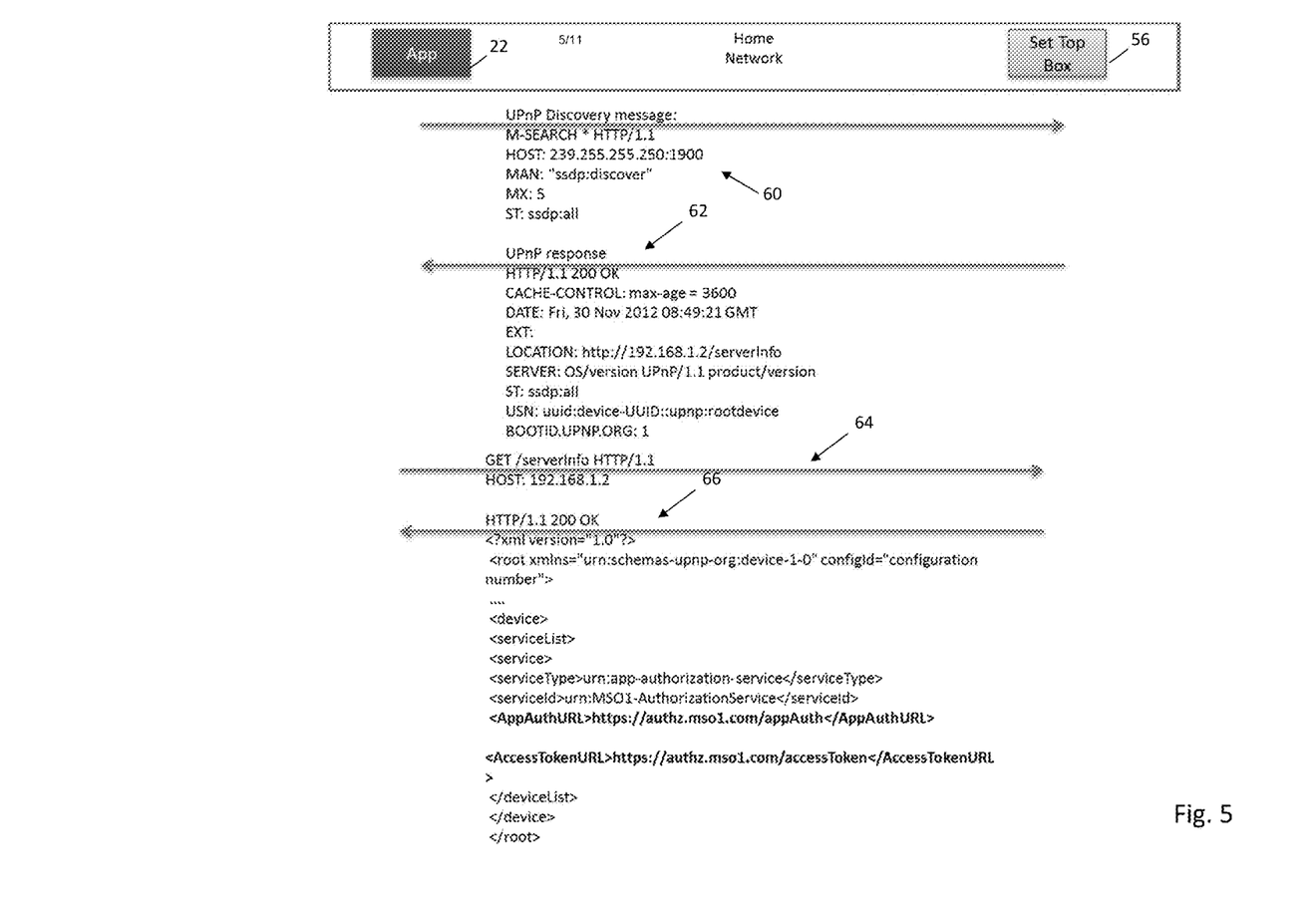
FIG. 5 illustrates a messaging diagram for a Universal Plug and Play (UPnP) discovery process in accordance with one non-limiting aspect of the present invention.

FIG. 5 illustrates a messaging diagram 54 for a Universal Plug and Play (UPnP) discovery process contemplated by one non-limiting aspect of the present invention. The UPnP discovery process 54 may correspond with the application 22 being provided the appAuthURL and the accessTokenURL as a function of processing executed with a device 56 other than the centralized discovery server 34 and/or the authorization server 32, such as a STB or other connected to the home network. The UPnP process 54 may correspond with the application 22 transmitting a UPnP discovery message 60 over the home network to identify the STB 56 or other device having information suitable to providing the appAuthURL and accessTokenURL, optionally including standard discovery parameters. The responding device 56 may transmit a UPnP response 62 having information related to addressing and other parameters suitable for use in retrieving the appropriate appAuthURL and accessTokenURL, e.g., the IP address of the STB (192.168.1.2) 56. In response to the UPnP response message 62, the application 22 may transmit an HTTP GET 64 to the IP address. The STB 56 or other device associate IP address may then respond with an acknowledgment message 66 identifying the appAuthURL and the accessTokenURL. Optionally, the responding device 56 may provide the appAuthURL and the accessTokenURL without verifying IP address if the responding device 56 is associated with a common service provider, i.e., it may already know what appAuthURL and accessTokenURL to be given to the application 22 and need not perform an IP address lookup.

Figure 6:
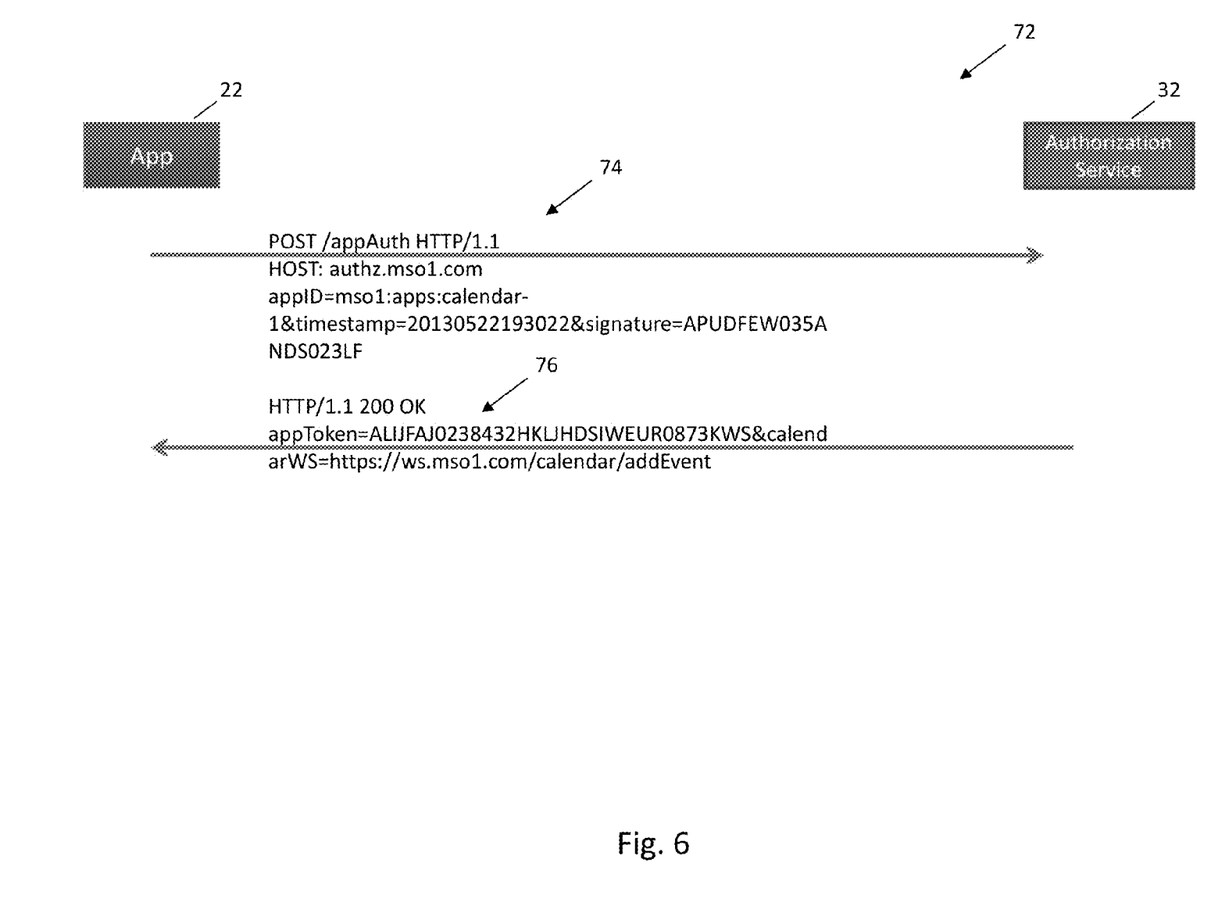
FIG. 6 illustrates a messaging diagram for registering an application in accordance with one non-limiting aspect of the present invention.

Bock 70 relates to registering the application 22 following discovery of the appropriate authorization server 32. The registering of the application 22 may be performed in order for the authorization server 32 to provide an application token (appToken) to the application for subsequent use in retrieving the access token. FIG. 6 illustrates a messaging diagram 72 for registering the application 22 in accordance with one non-limiting aspect of the present invention. The application registering process 72 may include the application 22 transmitting an HTTP POST 74 to the application server 32 to identify the application 22 and/or the Web service event to be performed with an application ID (mso1:apps:calendar). Optionally, a timestamp (20130522193022), a signature (APUDFEW035ANDS023LF) or other information may optionally be included within the HTTP POST 74. The timestamp may be useful in identifying the relevant period of time associated with requesting execution of the Web service 24 related event and the shared secret may be used to authenticate the application 22 with the authorization server 32 or otherwise establish a level of trust between the application 22 and authorization server 32. The authorization server 32 may verify the shared secret and/or perform other authentication related processes with the application 22 in response to the HTTP POST 74, and upon verification, transmit an acknowledgment message 76 having the appropriate appToken (ALIJFAJ0238432HKLJHDSIWEUR0873K) and an eventURL (https://ws.mso1.com/calendar/addEvent). The appToken may be a token or other credential to verify the legitimacy of the application 22, e.g., Web service providers may not want to allow 'any' application to access their services such that appToken may be used to limit only those application that either went through some vetting and/or signed a legal contract. The eventURL may specify a location at which the access token is to be provided in order to facilitate execution of the desired Web service 24.

Figure 7:
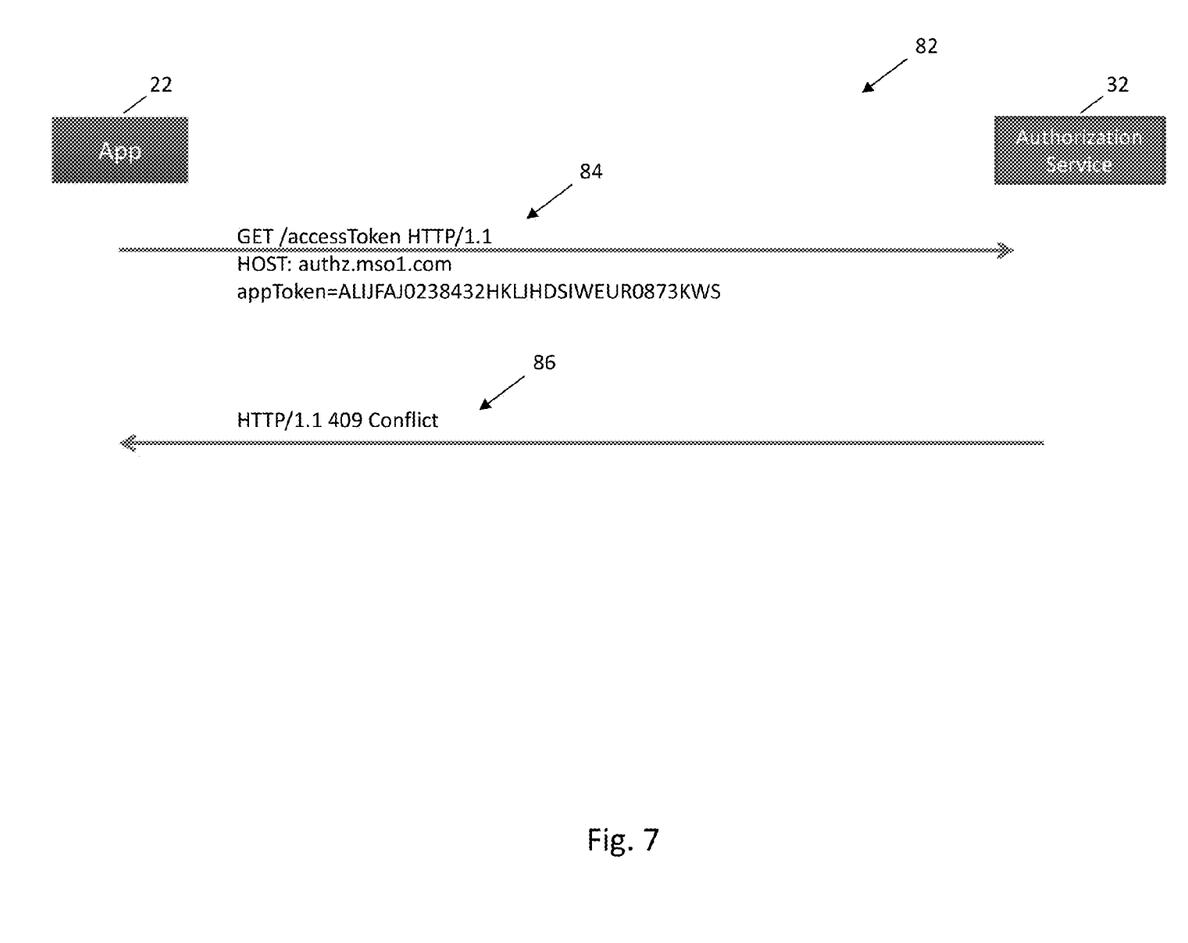
FIG. 7 illustrates a messaging diagram for application polling in accordance with one non-limiting aspect of the present invention.

Block 80 relates to the application polling for the access token. FIG. 7 illustrates a messaging diagram 82 for the application polling in accordance with one non-limiting aspect of the present invention. The application polling may include the application 22 transmitting a HTTP GET 84 to the authorization server 32 specified with the appAuthURL. The HTTP GET 84 may include the appToken previously provided to the application 22 indicating permission of the Web service provider for the application 22 to perform the Web event or otherwise engage an associated Web service 24. The authorization server 32 may verify the appToken, and if verified, determine whether a suitable third party permission to engage the corresponding Web service event has been provided. In the event such permission has not been obtained, as noted with a conflict response 86, Bock 90 relates to obtaining a third party authorization or permission. The third party authorization may correspond with interactions performed between the third party 26 and the associated user-agent 28 related to granting or denying the application 22 permission to execute the Web service event related to the appToken. One non-limiting aspect of the present invention contemplates obtaining the third party authorization without requiring the application 22 to interact with the user-agent 28. The authorization server 32 may be configured in accordance with the present invention to interact with the user-agent 28 in a manner sufficient to facilitate obtaining the third party authorization.

Figure 8:
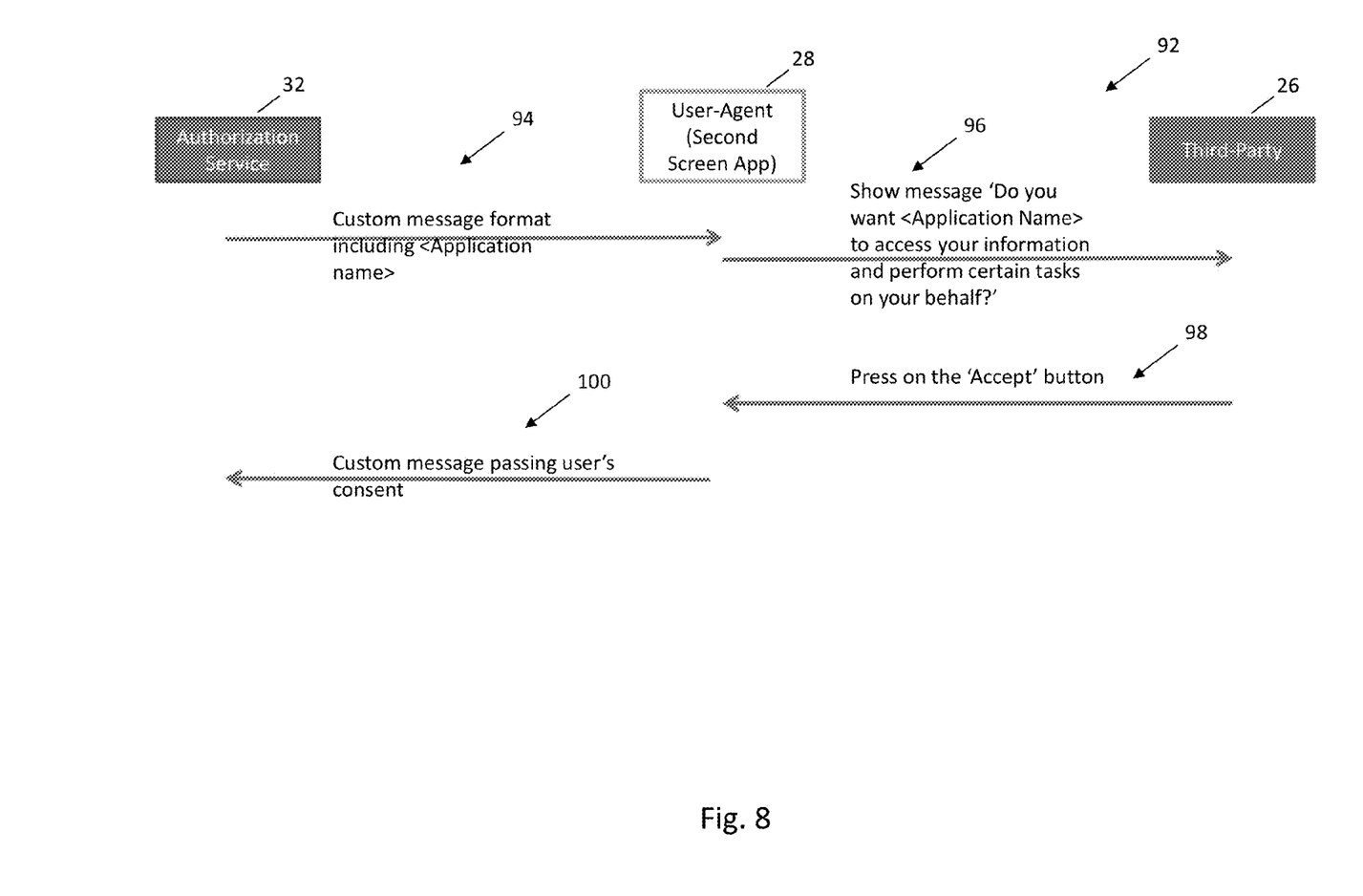
FIG. 8 illustrates a second screen messaging diagram for obtaining third party authorization in accordance with one non-limiting aspect of the present invention.

FIG. 8 illustrates a second screen messaging diagram 92 for obtaining the third party authorization in accordance with one non-limiting aspect of the present invention. The second screen process 92 may correspond with the user-agent 28 being a second screen application, such as but not limited to an application operating on a tablet or other device to facilitate television viewing or other media content interfacing through a primary device, such as but not necessary limited to another computer and/or a television in the manner described in U.S. patent application Ser. Nos. 12/827,147 and 13/865,030, the disclosures of which are hereby incorporated by reference in their entireties. The authorization server 32 may be configured to obtain the third party permission by transmitting a first message 94 to the user-agent. The first message 94 may specify an application name and other information regarding the application 22 attempting to execute the Web service event, optionally including information identifying the Web service event. The second screen application 28 may process the first message 94 in order to generate a second message 96 for display or other interfacing with the third party 26. The second message 96 may query the third party 26 as to whether the application 22 is authorized to perform the requested Web service event. An input 98 may be received from a third party 26 indicating acceptance or denial of the requested permission. A third message 100 may be transmitted from the user-agent 28 to the authorization server 32 indicating acceptance or denial of the requested permission.

Figure 9:
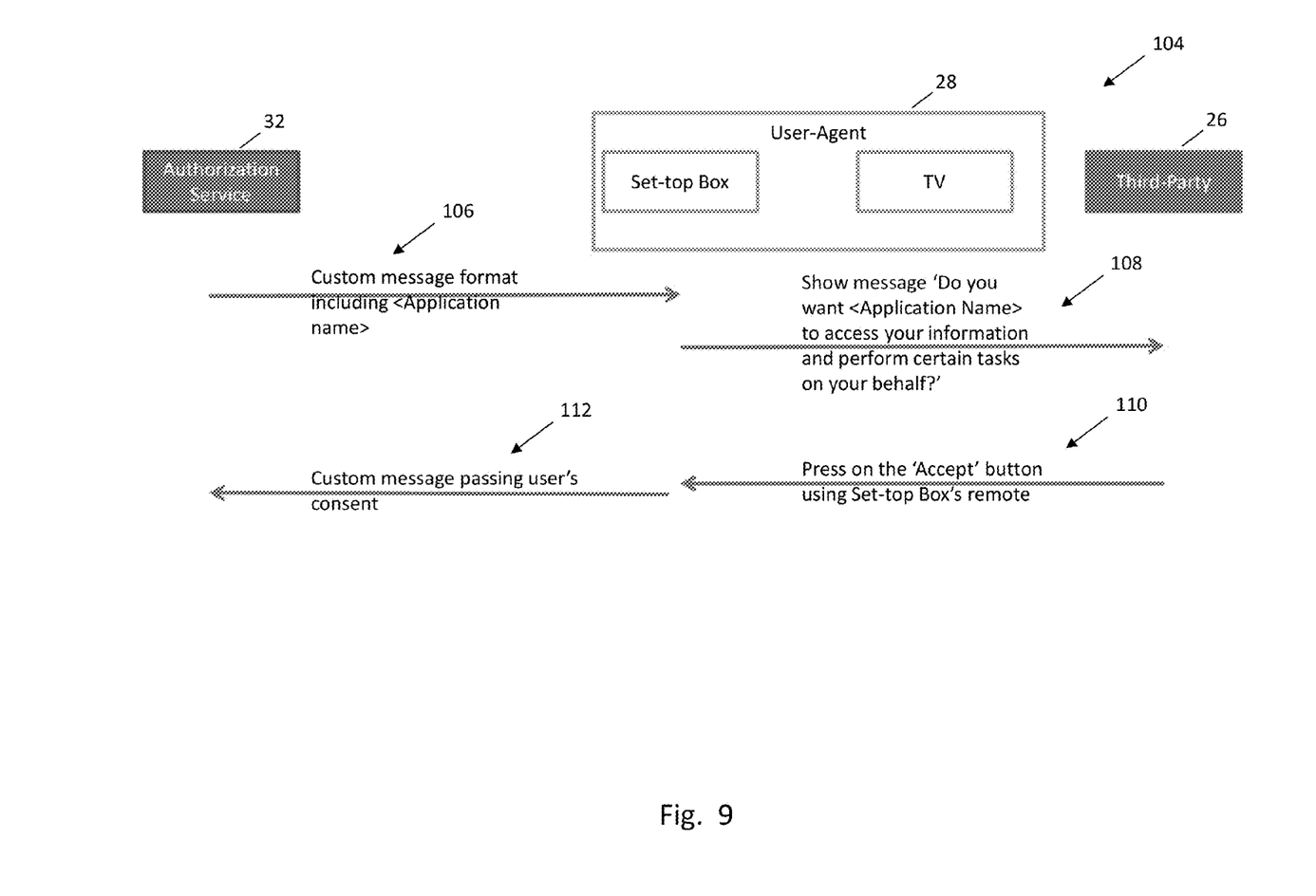
FIG. 9 illustrates a STB messaging diagram for obtaining third party authorization in accordance with one non-limiting aspect of the present invention.

FIG. 9 illustrates a STB messaging diagram 104 for obtaining the third party authorization in accordance with one non-limiting aspect of the present invention. The STB process 104 may correspond with the user-agent 28 being a STB and/or a television configured to provide television related servicing through the television. The authorization server 32 may be configured to obtain the third party permission by transmitting a first message 106 to the user-agent 28, the transmission of which may be limited to an STB previously associated with the network currently connected to the application 22 in order to limit permissions to local inputs. The first message 106 may specify an application name and other information regarding the application 22 attempting to execute the Web service event, optionally including information identifying the Web service event. The user-agent 28 may process the first message 106 in order to generate a second message 108 for display or other interfacing with the third party 26 by way of the television. The second message 108 may query the third party 26 as to whether the application 22 is authorized to perform the requested Web service event. An input 110 may be received by way of the television from the third party 26, such as in response actuation of a remote control, indicating acceptance or denial of the requested permission. A third message 112 may be transmitted from the user-agent 28 to the authorization server 32 indicating acceptance or denial of the requested permission.

Figure 10:
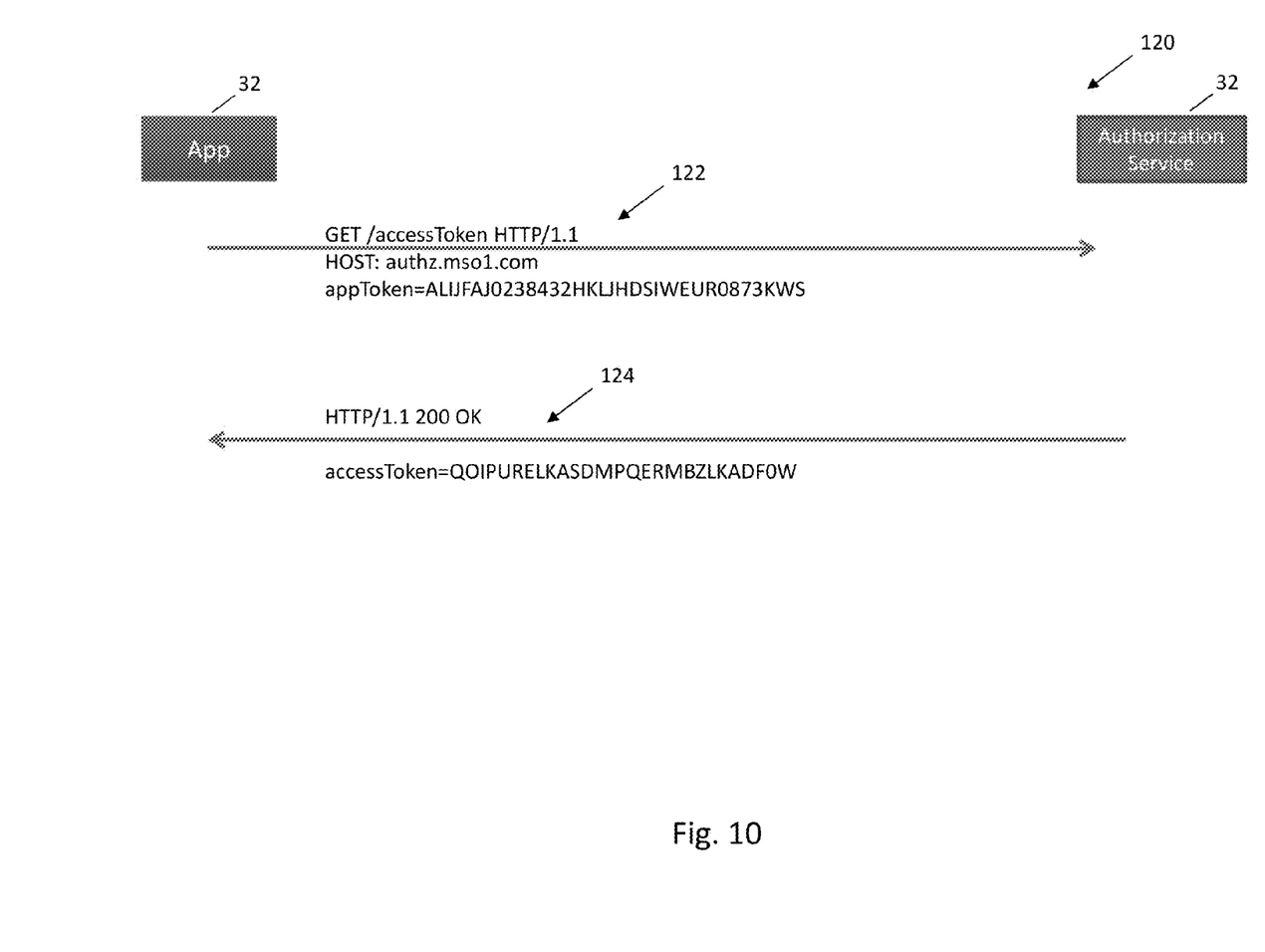
FIG. 10 illustrates a messaging diagram for a subsequent polling process in accordance with one non-limiting aspect of the present invention.
Figure 11:
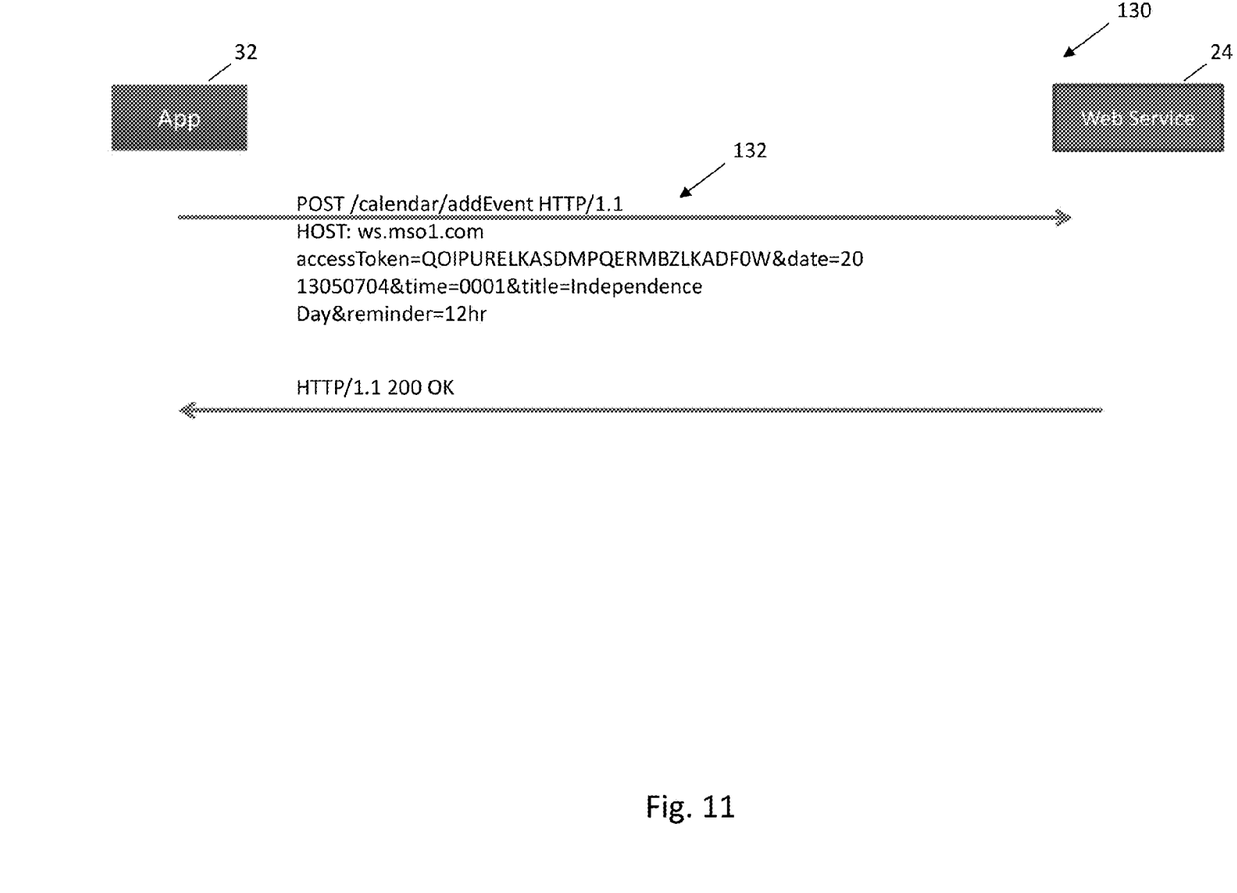
FIG. 11 illustrates an event messaging diagram for executing a Web service event in accordance with one non-limiting aspect of the present invention.

Block 116 relates to the application 22 receiving the access token. The access token may be generated by the authorization server 32 following receipt of the acceptance message 112 from the third party 26. The application 22 may receive the access token as part of a subsequent polling process, i.e., additional polling performed after receiving the conflict message 86. FIG. 10 illustrates a messaging diagram 120 for a subsequent polling process in accordance with one non-limiting aspect of the present invention. The subsequent polling process 120 may correspond with the application 22 issuing an HTTP GET 122 similar to the HTTP GET 84 issued in the previously described polling process 82. Rather than responding with a denial message 86, the authorization server 32 may now respond with a message 124 having the access token (accesToken) associated with the received appToken. The accesToken may be newly created after receiving the third party authentication in order to provide the permissions necessary for the application 22 to engage the Web service 24 in order to perform the desired Web service event on behalf of the third party 26. Block 126 relates to performing the Web service event following receipt of the accesToken at the Web service 24. FIG. 11 illustrates an event messaging diagram 130 for executing the Web service event in accordance with one non-limiting aspect of the present invention. The Web service event may be executed with the application 22 transmitting an HTTP POST 132 to the eventURL, including the access token and other parameters associated with implementing the desired event.

As supported above, one non-limiting aspect of the present invention contemplates improving operation of online applications and/or clients attempting to engage Web services using OAuth-type protocols to obtain user permission to access resources on their behalf. Examples include web sites acquiring email IDs and other attributes from 3rd party Identity Providers, and smart phone/tablet applications accessing information from or posting data to on behalf of users. Unlike protocols that assume the application and user are interacting synchronously and/or have a client infrastructure that the authenticating application supports (like a Web browser), one non-limiting aspect of the present invention contemplates an asynchronous permission model where the application is not necessarily required to interact with the user or user-agent synchronously (or at all).

One non-limiting aspect of the present invention contemplates a scenario where an application is 'aware' of the user either directly or indirectly. For example, an application could be 'related' to a user based on its location (somebody's home), their IP address, its proximity to other devices (discovered through proximity networking technologies like Bluetooth, ZigBee, or other) that are aware of the user's identity through some other methods (username/password authentication), so on. The present invention may enable that application to (automatically) retrieve data belonging to a particular user and/or to perform some action on behalf of a user. The contemplated information retrieval may be from an 'Identity Provider' the user belongs to. This information could have been 'input' to the application manually, or 'discovered' by the application, e.g., the application can query a centralized service to detect the user's IdP based off of user's IP address or there could be local 'discovery' services (UpNp service discovery provided by a cable set-top-box, for example) provided by the IdP. Optionally, in the event the application would also like to receive any user-related events—like, user logged off, user not in proximity, etc.—the present invention may support this scenario using an Identity Provider to associate a device/application with a user based on characteristics like IP address, location, etc. and/or using a device/application to contact a home gateway either through local network or proximity technologies like Bluetooth, ZigBee, etc. to let the Identity Provider know they are at or near the location of the user.

One non-limiting aspect of the present invention contemplates use of an Identity Provider (IdP). The IdP may be a server application that has user's credentials and data, and provides programmatic interfaces for applications to post data and/or perform certain functions. Examples of functions include 'post to my Facebook', 'post to my Twitter', 'add channel to my favorites', and so on. An application may be running in any device that wishes to obtain 'nearby' user's information and/or certain events belonging to that user's activity, or post data and/or perform functions on behalf of the user. A user may be an individual who has their credentials and data with the IdP and is 'nearby' the application. A gateway may be a device/application belonging to the Identity Provider that is capable of authenticating the user and may have a trusted relationship with the Identity Provider. A user and an application may have a pre-established relationship with the IdPs. Specifically, IdPs may have a way to 'authenticate' the User and the application. The models described herein may work with any authentication techniques. For authentication, applications may be identified by their application ID and users by their user ID. In addition, applications may also have unique instance IDs—one for each instance of the application. For example, a FooBar application may be running on TVs in a house-hold—the instance of the application in each home's TV may have a distinct/unique instance ID.

One asynchronous model contemplated by the present invention may include the IdP knowing that the user and the application are 'nearby' to each other. The sequence of steps that take place in this model may include one or more of the following: (1) application 'discovers' the IdP applicable to its location; (2) application contacts the IdP, authenticates itself and registers this particular instance of the application using a unique ID that the IdP provides to the application and the IdP may note the applications 'location'—either through its IP address, geographic co-ordinates, commonly shared location attributes, or other techniques; (3) application may request that it receive certain events belonging to the 'nearby' users, may some of their data, and may post certain data/invoke certain functions on their behalf where each such request may be called a 'permission'; (4) when a user comes near to the application, the IdP may 'discover' that and prompt the user for consent to the permissions requested, e.g., the IdP could discover this when the user accesses and 'IdP' portal and the IP address of the application and the IdP portal access could be the same or when an IdP Gateway constantly polls user's (geo-)location; (5) the user may provide their consent to some or all of the permissions requested by the application; (6) when the user provides their consent, the IdP may inform the application and provide a unique token that stands for a combination of the specific User (ID) and the permissions granted by the User; (7) the application may use that token to either access data belonging to that User and/or perform permitted functions on behalf of the User; and (9) the IdP may post any events relating to that user that the user permitted the application to get, such as 'User no longer near application'.

One asynchronous model contemplated by the present invention may include the proximity of an application to the user being 'deduced' through the interactions the user has through a nearby gateway. The user may be authenticated and known to the gateway a-priori, using any technique determined by the gateway. The application may converse with the gateway through an interface exposed by the gateway. Both the gateway and the application may know the interface details and the gateway and the application may 'discover' each other through any number of techniques—including Bluetooth, ZigBee, and UpNp. The sequence of steps that take place in this model may include: (1) application may 'discover' the IdP applicable to its location; (2) application may contact the IdP, authenticate itself and registers this particular instance of the application using a unique ID that the IdP provides to the application; (3) the application may also request that it receive certain events belonging to the 'nearby' users, be able to pull some of their data, and be able to post certain data/invoke certain functions on their behalf, which may each be called a 'permission'; (4) the application may 'discover' the gateway and invoke the (pre-determined) interface exposed by the gateway to provide its application ID and the unique instance ID it got from the IdP; (5) the gateway may pass the application ID and its instance ID to the IdP and/or the gateway may be contacted by multiple 'nearby' applications; (6) the IdP may, possibly through an interface provided by the gateway to the user, seek user's consent for each of the permissions sought by the application; the user may provide their consent to some or all of the permissions sought by the application; (7) the IdP may provide the user (and the permission's they consented to) specific token to the application; (8) the application may use that token to pull user's data and/or perform actions/invoke functions on behalf of the User; and (9) the IdP may provide events (consented by the user) to the application One non-limiting aspect of the present invention contemplates allowing seamless user awareness capabilities to applications running within a user's home—like applications on a smart TV, optionally without having to authorize such applications through direct interaction with the application and the environment hosting the application being expected to have certain capabilities (like browser support, for example). Since the techniques provided herein may not require direct interaction with the application by the user, there may be no requirements on the application/device's capabilities. Also, as a result, the user experience becomes richer and seamless. As devices become smarter, many applications are being developed in accordance with the present invention to run on these devices. User authentication and authorization for each of these applications may not be possible—depending on the nature of the application and the device/applications capabilities—such that the preset invention may be used enable applications to be 'automatically' aware of the user's identity and start providing services to them instantaneously, seamlessly and automatically. The techniques provided here can be used in a wide-spectrum of use cases where applications need to provide functionality to a user, but have no capability or opportunity to interact with the user. Also, as user authentication techniques become increasingly sophisticated, the present invention may be used with application where it may not possible to provide the necessary UI to support those techniques.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium having a plurality of non-transitory instructions, which when executed with a processor, are sufficient to facilitate providing an access token to an application without requiring the application to interact with a user-agent through which a third party contemporaneously authorizes use of the access token, the non-transitory instructions being sufficient to facilitate:
retrieving an application authorization universal resource locator (appAuthURL);
retrieving an access token universal resource locator (accessTokenURL);
providing an application ID and a shared secret to the appAuthURL, the application ID identifying the application requiring access to a service, an authorization server at the appAuthURL generating an application token (appToken) and an event URL (eventURL) when the shared secret is verified, the appToken granting permission to the application to perform an event at the eventURL related to the service;
polling the accessTokenURL to obtain an access token (accessToken), the accessToken indicating third party approval for the application to perform the event on behalf of the third party, the authorization server at the accessTokenURL providing the accessToken to the application as a part of the polling if the appToken is verified and the third party contemporaneously engages a user-agent to authorize the application, the accessToken being provided to the application without the application performing a related interaction with the user-agent; and
providing the accessToken to the eventURL, thereby enabling the application to perform the event.

2. The non-transitory computer-readable of claim 1 further comprising non-transitory instructions sufficient for retrieving the appAuthURL and the accessTokenURL with a Hypertext Transfer Protocol (HTTP) GET transmitted to a centralized discovery server, the centralized discovery server providing the appAuthURL and the accessTokenURL when an application IP address transmitted with the HTTP GET is verified.

3. The non-transitory computer-readable of claim 2 wherein the centralized discovery server verifies the application IP address when the application IP address matches a verified IP address previously provided to the centralized discovery server from the authorization server.

4. The non-transitory computer-readable of claim 3 wherein the authorization server provides the appAuthURL and the accessTokenURL to the centralized discovery server for association with the verified IP address, the centralized discovery server identifying the appAuthURL and the accessTokenURL transmitted to the application from a plurality of URLs associated with other IP addresses.

5. The non-transitory computer-readable of claim 1 further comprising non-transitory instructions sufficient for retrieving the appAuthURL and the accessTokenURL with a Universal Plug and Play (UPnP) GET transmitted from the application to a settop box (STB), the STB sharing a connection to a local area network (LAN).

6. The non-transitory computer-readable of claim 5 further comprising performing a UPnP discovery for the STB, the UPnP discovery identifying an STB address for the STB, the application transmitting the UPnP GET to the STB address.

7. The non-transitory computer-readable of claim 5 wherein the authorization server provides a permission message to the STB, the STB being at least part of the user-agent and configured to facilitate interactions with the third party associated with authorizing the access token, the permission message identifying the application and/or the event for authorization by the third party.

8. The non-transitory computer-readable of claim 1 wherein the authorization server provides a permission message to a second screen application, the second screen application being included on the user-agent to facilitate interactions with the third party, the permission message identifying the application and/or the event for authorization by the third party.

9. The non-transitory computer-readable of claim 1 further comprising non-transitory instructions sufficient for unsuccessfully polling the accessTokenURL at least once prior to being provided the accessToken from the authorization server, the unsuccessful polling being performed prior to the third party authorizing use of the accessToken.

10. A method of enabling an application operating on a device to direct a Web service to perform an event on behalf of a third party, the Web service requiring receipt of an access token (accessToken) issued from an authorization server in order to perform the event, the authorization server generating the accessToken following receipt of a third party permission from an user-agent, the user-agent providing a user interface for receiving the third party permission from the third party, the method comprising:
providing from the device an application ID and a shared secret to the authorization server, the application ID identifying the application requesting to perform the event, the authorization server generating an application token (appToken) and an event URL (eventURL) if the shared secret is verified, the appToken granting permission to the application to perform the event;
providing from the device the appToken to the authorization server, and if verified by the authorization server, responsively obtaining at the device the accessToken from the authorization server, whereby the application obtains the accessToken without interacting with the user-agent; and
providing from the device the accessToken to the eventURL to enable the application to perform the event.

11. The method of claim 10 further comprising providing the application ID and the shared secret from the device to an application authorization universal resource locator (appAuthURL) and the appToken to an access token universal resource locator (accessTokenURL).

12. The method of claim 11 further comprising transmitting from the device a Hypertext Transfer Protocol (HTTP) GET to a centralized discovery server to obtain the appAuthURL and the accessTokenURL, the centralized discovery server providing the appAuthURL and the accessTokenURL to the device if an application IP address transmitted with the HTTP GET is verified, the application ID being associated with the application.

13. The method of claim 12 wherein the centralized discovery server verifies the application IP address when the application IP address matches a verified IP address previously provided to the centralized discovery server from the authorization server.

14. The method of claim 13 wherein the authorization server provides the appAuthURL and the accessTokenURL to the centralized discovery server for association with the verified IP address, the centralized discovery server identifying the appAuthURL and the accessTokenURL transmitted to the device from a plurality of URLs associated with other IP addresses.

15. The method of claim 11 further comprising retrieving the appAuthURL and the accessTokenURL with the device using a Universal Plug and Play (UPnP) GET transmitted from the application to a settop box (STB), the STB sharing a connection to a local area network (LAN).

16. The method of claim 15 further comprising the device performing a UPnP discovery for the STB, the UPnP discovery identifying an STB address for the STB, the application transmitting the UPnP GET to the STB address.

17. The method of claim 16 wherein the authorization server provides a permission message to the STB, the STB being at least part of the user-agent and configured to facilitate interactions with the third party associated with the authorization server obtaining the third party permission.

18. The method of claim 17 wherein the authorization server provides a permission message to a second screen application, the second screen application being configured to supplement content showing through the STB, the screen application being included on the user-agent to facilitate interactions with the third party associated with the authorization server obtaining the third party permission.

19. A system for engaging a Web service to perform an event on behalf of a third party, the system comprising:
   an application operable to issue a request to the Web service to perform the event on behalf of the third party, the application operable to include an access token (accessToken) with the request, the Web service verifying the accessToken prior to performing the event;
   an authorization server operable to provide the accessToken to the application, the authorization server verifying an application token (appToken) provided from the application prior to providing the accessToken; and
   a user-agent operable to receive a third party permission from the third party, the third party permission indicating approval of the third party for the application to perform the event on behalf of the third party, the user-agent identifying the application requesting to perform the event as a function of an application ID provided from the authorization server and without corresponding interaction with the application.

20. The system of claim 19 wherein the user-agent is a settop box (STB) operable to interface television signaling with a television, the STB receiving the third party permission as function of inputs received from a second screen application, the second screen application executing on a tablet to augment the television signaling.

* * * * *